United States Patent

Murase et al.

Patent Number: 5,318,681
Date of Patent: Jun. 7, 1994

[54] CATHODIC ELECTRODEPOSITION PAINT

[75] Inventors: Kunio Murase, Itami; Shigehiko Isoyama, Daito; Koichi Iwamoto, Kawasaki, all of Japan

[73] Assignee: Nippon Paint Co., Ltd., Osaka, Japan

[21] Appl. No.: 52,977

[22] Filed: Apr. 27, 1993

[51] Int. Cl.$^5$ ............................................. C23D 13/10
[52] U.S. Cl. .................................. 204/181.7; 523/203; 523/212; 523/414; 524/447
[58] Field of Search .................. 523/414, 203, 212; 524/447; 204/181.7

[56] References Cited

U.S. PATENT DOCUMENTS 4,151,154  4/1979  Berger .................................. 523/203

Primary Examiner—Melvyn I. Marquis
Assistant Examiner—David Aylward
Attorney, Agent, or Firm—Millen, White, Zelano & Branigan

[57] ABSTRACT

Wet films of cathodic electrodeposition paints are rendered hardly susceptible to oil droplet-induced craters by incorporating a clay pigment surface treated with a silane coupling agent into the paint formulation. Surface smoothness and bath stability are not compromised by the addition of the clay pigment.

9 Claims, No Drawings

CATHODIC ELECTRODEPOSITION PAINT

BACKGROUND OF THE INVENTION

This invention relates to a cathodic electrodeposition paint. When a number of metallic substrates are successively coated with an electrodeposition paint while conveying the substrates along a coating line including various operational stations, oil droplets or mist necessarily entrained in air currents or scattered from associated machines may degrade the quality of the finish. This is because oil droplets deposited on the wet paint film before or during the baking operation radially expel an amount of paint to produce a number of tiny craters.

Methods are known to prevent oil droplet-induced craters from forming including the incorporation of kaolin or other flaky body pigments into the paint formulation to increase the pigment concentration and/or the use of high molecura weight vehicle resins to decrease the paint fluidity. These known methods, however, must suffer from decrease in smoothness of the cured paint film in terms of average surface roughness commonly represented by the notation Ra.

Accordingly, a need exists for a cathodic electrodeposition paint which is hardly susceptible to oil droplet-induced craters without compromising the surface smoothness of the cured paint film.

SUMMARY OF THE INVENTION

According to the present invention, there is provided a cathodic electrodeposition paint which is hardly susceptible to oil droplet-induced craters and which gives a coating film having an excellent surface smoothness upon baking. The paint comprises an aqueous dispersion of an electrically depositable cationic film-forming resin, and a clay pigment surface treated with a silane coupling agent, the weight ration of said clay pigment to the solids content of said film-forming resin being from about 1 to about 50 parts, preferably from about 5 to about 25 parts per 100 parts of said film-forming resin.

By modifying the surface chemistry of the clay pigment with a silane coupling agent, the clay pigment may eliminate or significantly reduce the susceptibility of a cathodic electrodeposition paint to oil droplet-induced craters when added thereto. Nevertheless, the clay pigment so treated does not adversely affect the bath stability and the surface smoothness.

DESCRIPTION OF THE PREFERRED EMBODIMENT

A variety of film-forming resins usable in cathodic electroposition paints are known. These resins generally have a number of positively chargeable hydrophilic groups such as amino groups. Any of known cationic resins may be used in the present invention including amine-modified epoxy resins as disclosed in Japanese Patent Publication (Kokai) Nos. 4978/1979 and 34186/1981, amine-modified polyurethane resins as disclosed in Japanese Laid Open Patent Application (Kokai) Nos. 15449/1979 and 115476/1980, amine-modified polybutadiene polymers as disclosed in Japanese Patent Publication No. 61077/1987 and Japanese Laid Open Patent Application No. 86766/1988, amine-modified acrylic resins as disclosed in Japanese Laid Open Patent Application No. 139909/1988 and Japanese Patent Publication No. 60516/1989, and the corresponding sulfonium or phosphonium resins. These resins may be classified, depending upon the curing mechanism, into self-crosslinkable resins which cure through a radical or oxidation polymerization reaction, externally crosslinkable resins which crosslink with an external crosslinker such as blocked polyisocyanate compounds or aminoplast resins, and combinations thereof. These resins may also be classified, depending upon the type of curing energy, into room temperature-curing resins, thermally curing resins, and radiation-curing resins. In order to enhance various properties, resins free from chargeable hydrophilic groups such as epoxy acrylate resins are often used in the form an emulsion in conjunction with a cationic resin. The term "electrically depositable cationic film-forming resins" as used herein includes mixtures with external crosslinkers and/or nonchargeable resins. Further details of electrically depositable cationic resins are well-known in the art and the resins per se do not constitute a part of the present invention.

The cathodic electrodeposition paint of the present invention contains a clay pigment surface treated with a silane coupling agent The amount of the clay pigment ranges from about 1 to about 50 parts, preferably from about 5 to about 25 parts by weight per 100 parts by weight of the solids content of the film-forming resin. With amounts less than the above range, the clay pigment will not virtually be effective to prevent oil droplet-induced craters. Conversely excessive addition of the clay pigment will adversely affect the film appearance.

Usable silane coupling agents include aminosilanes, vinylsilanes, epoxysilanes and other known silane coupling agents. Aminosilanes and vinylsilanes are preferred as they contribute to increased paint bath stability. Commercial products available from Engelhard Corp. under the name of TRANSLINK 37 (vinylsilane) and TRANSLINK 555 (aminosilane) may be used to advantage. The clay pigment is preferably added to the aqueous dispersion of cationic film-forming resins in the form of a pigment paste. If necessary, other pigments may be incorporated into the pigment paste. Examples thereof include coloring pigments such as titanium dioxide, carbon black or ferric oxide; extender pigments such as aluminum silicate, precipitated barium sulfate, silica or precipitated calcium carbonate; and rustproof pigments such as aluminum phosphomolybdate, strontium chromate, basic lead silicate or lead chromate.

Depending upon the type of film-forming resins, the paint of the present invention may contain external crosslinkers such as melamine resins, guanamine resins, phenol resins or blocked polyisocyanate compounds; curing catalysts such as manganese, cobalt, copper, lead or tin compounds; surfactants; UV absorbers; and other conventional additives.

The above components are dispersed in an aqueous medium containing an acid such as phosphoric, acetic, propionic or lactic acid as a neutraliziny agent for the cationic film-forming resin. The aqueous medium is water or a mixture of water and a water-miscible organic solvent such as ethylcellosolve, propylcellosolve, butylcellosolve, ethylene glycol dimethyl ether, diacetone alcohol, 4-methoxy-4-methylpetanone-2 or methyl ethyl ketone. A minor proportion of water-immiscible organic solvents such as toluene, xylene, ethyl isobutyl ketone or 2-ethylhexanol may be included in the aqueous medium.

The cathodic electrodeposition paint of the present invention is usually adjusted to a nonvolatile content of 10-20 % and applied electrically onto substrates to a dry film thickness of 15-30 microns. The film so applied may be cured, depending upon the type of resins, through air drying, baking, irradiation with UV radiation or electron beam.

The invention is further illustrated by the following examples in which all parts and percents are by weight unless otherwise indicated.

PRODUCTION EXAMPLE 1

Cationic Film-Forming Resin 970 parts EPIKOTE 1001 (epoxy resin, sold by Yuka Shell Epoxy Company, epoxy equivalent 485) and 265 parts of polycaprolactone diol (sold under the name of TONE 0200 by Union Carbide Corporation, M.W. about 543) were placed in a suitable reactor and heated to 100° C. in a nitrogen gas atmosphere. 0.46 parts of dimethylbenzylamine were added to the mixture and allowed to react at 130° C. for 1.5 hours. Then the reaction mixture was cooled to 110° C. To this were added 110 parts of methyl isobutyl ketone (MIBK), 39.8 parts of a 73% solution of diethylenetriamine methyl isobutyl ketimine in MIBK, and 100 parts of MIBK. Then the mixture was cooled to 70° C. After adding 53.1 parts of diethylamine, the mixture was heated at 120° C. for 3 hours to complete the reaction. The resulting solution referred to as "First Liquid" has a nonvolatile content of 75%.

Using a separate reactor, 291 parts of toluenediisocyanate (mixture of 2,4- and 2,6-isomers at a ratio of 80:20) (TDI) were reacted with 218 parts of 2-ethylhexanol for 0.5 hours in a nitrogen atmosphere with stirring at 38° C. while cooling externally. The reaction mixture was then heated to 60° C. To this were added 75 parts of trimethylolpropane and 0.08 parts of dibutyltin dilaurate. The mixture was allowed to react for 1.5 hours at 121° C. until substantially all isocyanato functions disappeared when confirmed IR spectrometrically. This reaction product was diluted with 249 parts of ethyleneglycol monomethyl ether to give a solution referred to as "Second Liquid" having a nonvolatile content of 70%.

PRODUCTION EXAMPLE 2

Vehicle for Pigment Paste

| Material | Parts | Solids |
| --- | --- | --- |
| 2-Ethylhexanol-half capped TDI in MIBK | 320.0 | 304.0 |
| Dimethylethanolamine | 87.2 | 87.2 |
| Lactic acid solution | 117.6 | 88.2 |
| Butylcellosolve | 39.2 | — |

Using a suitable reactor, 2-ethylhexanol-half capped TDI was mixed with dimethylethanolamine at room temperature. An exothermic reaction took place. The mixture was stirred at 80° C. for one hour. To this were added lactic acid solution and butylcellosolve followed by stirring at 65° C. for about 30 minutes to give a liquid referred to as "Quarternizing Agent".

| Material | Parts | Solids |
| --- | --- | --- |
| EPIKOTE 829[1] | 710.0 | 681.2 |
| Bisphenol A | 289.6 | 289.6 |
| 2-Ethylhexanol-half capped TDI in MIBK | 406.4 | 386.1 |
| Quarternizing Agent | 496.3 | 421.9 |
| Deionized water | 71.2 | — |
| Butylcellosolve | 567.6 | — |

[1] Bisphenol A epoxy resin sold by Yuka Shell Epoxy Company, Epoxy equivalent 193-203.

EPIKOTE 829 and bisphenol A were reacted in a reactor in a nitrogen gas atmosphere at 150°-160° C. for about one hour. After cooling to 120° C., 2-ethylhexanol-half capped TDI was added. The mixture was allowed react at 110°-120° C. for about one hour. Then butylcellosolve was added. After cooling to 85°-95° C., the mixture was diluted with deionized water and then reacted with Quarternizing Agent until an acid number of 1.0 was reached. 429 parts of this liquid were diluted with 101 parts of butylcellosolve and 470 parts of deionized water to a nonvolatile content of 30%.

PRODUCTION EXAMPLE 3

Pigment Paste A

| Material | Parts | Solids |
| --- | --- | --- |
| Diluted vehicle of Production Ex. 2 | 1666.7 | 500 |
| Carbon black | 81 | 81 |
| TRANSLINK 555[2] | 791.8 | 791.8 |
| Lead silicate | 67.2 | 67.2 |
| Dibutyltin oxide | 60 | 60 |
| Deionized water | 217.9 | — |

[2] Amino silane-surface treated kaolin sold by Engelhard Corp.

The above materials were dispersed in a sand grind mill to a particle size less than 10 micron. Then the paste was adjusted to a total solids content of 52.0%, a resin content of 17.3% and a pigment content of 34.7% with deionized water.

EXAMPLE 1

Cathodic Electrodeposition Paint

| Material | Parts |
| --- | --- |
| First Liquid of Production Ex. 1 | 576 |
| Second Liquid of Production Ex. 1 | 310 |
| Ethylene glycol monohexyl ether | 35.5 |
| Glacial acetic acid | 12.3 |
| Deionized water | 741 |
| Pigment Paste A of Production Ex. 3 | 313 |
| Deionized water | 2453 |

First Liquid and Second Liquid of Production Example 1 were mixed with ethylene glycol monohexyl ether. The mixture was neutralized with glacial acetic acid and gradually diluted with deionized water. Then Pigment past A was thoroughly mixed. Finally the paint was diluted with the remaining amount of deionized water to a solids content of 20%.

PRODUCTION EXAMPLE 4

Pigment Paste B

| Material | Parts | Solids |
| --- | --- | --- |
| Diluted vehicle of Production Ex. 2 | 1333.3 | 400.0 |
| Carbon black | 36.0 | 36.0 |
| Titanium dioxide | 452.0 | 452.0 |
| TRANSLINK 37[3)] | 400.0 | 400.0 |
| Lead silicate | 67.2 | 67.2 |
| Dibutyltin oxide | 44.8 | 44.8 |
| Deionized water | 212.2 | — |

[3)]Vinylsilane-surface treated kaolin sold by Engelhard Corp.

Analogous to Production Example 3, Pigment Paste B having a total solids content of 55.0%, a resin content of 15.7% and a pigment content of 39.3% was produced.

EXAMPLE 2

Cathodic Electrodeposition Paint

| Material | Parts |
| --- | --- |
| First Liquid of Production Ex. 1 | 576 |
| Second Liquid of Production Ex. 2 | 310 |
| Ethylene glycol monohexyl ether | 21.3 |
| Glacial acetic acid | 12.3 |
| Deionized water | 544.3 |
| Pigment Paste B | 502.1 |
| Deionized water | 2467 |

Analogous to Example 1, a cathodic electrodeposition paint was produced.

PRODUCTION EXAMPLE 5

Pigment Past C (for comparison)

| Material | Parts | Solids |
| --- | --- | --- |
| Diluted vehicl of Production Ex. 1 | 1666.7 | 500 |
| Carbon black | 36.0 | 36.0 |
| Titanium dioxide | 441.8 | 441.8 |
| Kaolin[4)] | 395.0 | 395.0 |
| Lead silicate | 67.2 | 67.2 |
| Dibutyltin oxide | 60.0 | 60.0 |
| Deionized water | 245.9 | — |

[4)]Commercial product not surface treated with silane coupling agent.

Analogous to Production Example 3, Pigment Paste C having a total solids content of 51.5%, a resin content or 17.2% and a pigment content of 34.3% was produced.

COMPARATIVE EXAMPLE

Cathodic Electrodeposition Paint

| Material | Parts |
| --- | --- |
| First Liquid of Production Ex. 1 | 576 |
| Second Liquid Production Ex. 1 | 310 |
| Ethylene glycol monohexyl ether | 21.3 |
| Glacial acetic acid | 12.3 |
| Deionized water | 964.7 |
| Pigment Paste C | 376.7 |
| Deionized water | 2261 |

Analogous to Example 1, a cathodic electrodeposition paint was produced.

Paint Evaluation

Paints of Examples and Comparative Example were each applied on a zinc phosphate-treated steel plate by immersing the plate in a paint bath as a cathode and passing DC current at 200 volt for 3 minutes. The resulting paint film was washed with water and baked at 170° C. for 30 minutes to give a film thickness of 20 microns.

Evaluation method:

1. Susceptibility to oildroplet-induced craters: 0.1 ml of a lubricant oil (NOCKTHRUST 320 sold by Parker Kosan Company) was scattered as droplets onto a wet film of 7 cm×15 cm size. Then the film was baked. The number of craters was visually counted.

$0: 0-2; \Delta: 3-10; x: >10$

2. Surface smoothness: Using a surface roughness meter (SURTRONIC 3P, Tayler Hobson Company), average surface roughness (Ra), was measured and expressed in micron.

3. Bath stability: 1,000 g of paint was stirred for 7 days and thereafter filtered through a 380 mesh screen. The amount of retained solids was weighed and expressed in mg.

The results are shown in the table below.

| Item | Ex. 1 | Ex. 2 | Comp. Ex |
| --- | --- | --- | --- |
| Craters | 0 | 0 | Δ |
| Surface smoothness | 0.30 | 0.28 | 0.35 |
| Bath stability | 25 | 20 | 50 |

We claim:

1. A method for preventing the formation of oil droplet-induced craters on a coating of a paint applied on a substrate by cathodic electrodeposition, which comprises employing as the paint a cathodic electrodeposition paint comprising an aqueous dispersion of an electrically depositable cationic film-forming resin, and a clay pigment surface treated with a silane coupling agent, the weight ratio of said clay pigment to the solids content of said film-forming resin being from about 1 to about 50 parts per 100 parts of said film-forming resin.

2. The method of claim 1, wherein said ratio is from about 5 to about 25 parts per 100 part of said film-forming resin.

3. The method of claim 1, wherein said clay pigment is kaolin.

4. The method of claim 1, wherein said silane coupling agent is an aminosilane or a vinylsilane.

5. The method of claim 1, wherein said clay pigment is kaolin and wherein said silane coupling agent is an aminosilane or a vinylsilane.

6. The method of claim 5, wherein said ratio is from about 5 to about 25 parts per 100 part of said film-forming resin.

7. A method according to claim 1, wherein the substrate is a steel plate.

8. A method according to claim 1, wherein the coating is cured by heating.

9. A method according to claim 7, wherein the coating is applied to the steel plate by immersing the steel plate as a cathode in a bath of the paint.

* * * * *